(12) United States Patent
Ratner

(10) Patent No.: US 9,327,844 B2
(45) Date of Patent: May 3, 2016

(54) METHODS AND MECHANISMS FOR BALLOON LAUNCHING

(71) Applicant: Google Inc., Mountain View, CA (US)

(72) Inventor: Daniel Ratner, San Francisco, CA (US)

(73) Assignee: Google Inc., Mountain View, CA (US)

( * ) Notice: Subject to any disclaimer, the term of this patent is extended or adjusted under 35 U.S.C. 154(b) by 257 days.

(21) Appl. No.: 14/179,710

(22) Filed: Feb. 13, 2014

(65) Prior Publication Data

US 2015/0225091 A1   Aug. 13, 2015

(51) Int. Cl.
*B64B 1/40*   (2006.01)
*B64F 1/04*   (2006.01)
*B64B 1/58*   (2006.01)

(52) U.S. Cl.
CPC ... *B64F 1/04* (2013.01); *B64B 1/40* (2013.01); *B64B 1/58* (2013.01)

(58) Field of Classification Search
USPC .............. 244/31, 98, 30, 126, 128, 1 R, 2, 63
See application file for complete search history.

(56) References Cited

U.S. PATENT DOCUMENTS

| | | | | | |
|---|---|---|---|---|---|
| 1,686,084 | A | * | 10/1928 | Hall | B64B 1/62 244/97 |
| 3,081,967 | A | | 3/1963 | Church | |
| 3,507,462 | A | | 4/1970 | Stefan | |
| 3,814,353 | A | | 6/1974 | Nelson | |
| 4,995,572 | A | | 2/1991 | Piasecki | |
| 5,056,740 | A | * | 10/1991 | Roth | B64G 1/1021 244/138 R |
| 5,173,690 | A | * | 12/1992 | Friedman | G01S 11/026 340/870.1 |
| 5,636,480 | A | * | 6/1997 | Lauritsen | B64F 1/14 244/33 |
| 5,884,862 | A | * | 3/1999 | Aurilio | G01W 1/08 244/1 TD |
| 5,895,010 | A | * | 4/1999 | Aurilio | G01W 1/08 244/1 TD |
| 5,901,922 | A | | 5/1999 | Aurilio et al. | |
| 7,341,224 | B1 | * | 3/2008 | Osann, Jr. | B64C 39/028 244/30 |
| 7,648,102 | B2 | * | 1/2010 | French | G01W 1/08 244/31 |
| 8,091,826 | B2 | * | 1/2012 | Voorhees | B64B 1/38 244/97 |
| 8,814,084 | B2 | * | 8/2014 | Shenhar | A63H 27/10 244/128 |
| 8,910,905 | B2 | * | 12/2014 | DeVaul | B64B 1/40 244/31 |
| 8,918,047 | B1 | * | 12/2014 | Teller | H04B 7/18513 455/15 |
| 9,174,720 | B1 | * | 11/2015 | Ratner | B64B 1/62 |
| 2005/0014499 | A1 | * | 1/2005 | Knoblach | B64B 1/40 455/431 |
| 2014/0021288 | A1 | * | 1/2014 | Elson | B64C 39/024 244/2 |
| 2015/0183520 | A1 | * | 7/2015 | Elson | B64D 5/00 244/2 |
| 2015/0284065 | A1 | * | 10/2015 | MacCallum | B64B 1/02 244/30 |

\* cited by examiner

*Primary Examiner* — Christopher P Ellis
(74) *Attorney, Agent, or Firm* — McDonnell Boehnen Hulbert & Berghoff LLP

(57) ABSTRACT

A method for balloon launching may include loading a pre-packaged balloon and payload into a shell structure. The pre-packaged balloon may be pulled out of its packaging in a vertical direction, for instance using a gantry crane. The gantry crane may be configured to inflate the balloon from the top of the envelope. The balloon may be inflated while substantially within the shell structure, which may provide protection from wind gusts. A vehicle, such as a heavy forklift, may provide mobility and support for the balloon and shell. Once the balloon is inflated, the vehicle may move the balloon/shell combination at a rate and direction substantially matching the current wind direction/speed. Furthermore, after reaching a zero-velocity condition relative to the wind, the vehicle may assist and/or initiate the opening of the shell. A tether connecting the balloon to the shell structure may be disconnected, allowing the balloon to launch.

20 Claims, 9 Drawing Sheets

METHODS AND MECHANISMS FOR BALLOON LAUNCHING

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Network infrastructure may be costly, however, and thus, some techniques may utilize temporary or non-permanent structures. Deployment of such temporary or non-permanent structures may also present challenges.

SUMMARY

In a first aspect, a method is provided. The method includes providing a balloon positioned substantially within a shell structure. The balloon includes an envelope in an inflated state. The method also includes determining, based on wind data associated with an external environment outside the shell structure, a wind direction and a wind velocity of wind in the external environment. Yet further, the method includes causing the shell structure to move in a direction and at a velocity resulting in a substantial zero-wind condition. The zero-wind condition includes the direction being in about the wind direction and the velocity being at about the wind velocity. The method additionally includes in response to the substantial zero-wind condition, causing the shell structure to open such that the balloon is exposed to the external environment, and launching the balloon.

In a second aspect, a system is provided. The system includes a shell structure configured to substantially enclose a balloon and open such that the balloon is exposed to an external environment. The balloon includes an envelope in an inflated state. The external environment includes environmental conditions outside the shell structure. The system also includes a movement element configured to move the shell structure in a plane substantially parallel to the ground surface. The system additionally includes a control system configured to determine, based on wind data from at least one wind sensor, a wind direction and a wind velocity of wind in the external environment. The control system may further be configured to cause the movement element to move in a direction and at a velocity resulting in a substantial zero-wind condition. The zero-wind condition includes the direction being in about the wind direction and the velocity being at about the wind velocity. The control system may also be configured to, in response to the substantial zero-wind condition, cause the shell structure to open and the balloon to launch.

In a third aspect, a non-transitory computer readable medium having stored instructions is provided. The instructions are executable by a computing device to cause the computing device to perform functions. The functions include determining, based on wind data associated with an external environment outside a shell structure enclosing a balloon, a wind direction and a wind velocity of wind in the external environment. The functions further include causing the shell structure to move in a direction and at a velocity resulting in a substantial zero-wind condition. The zero-wind condition includes the direction being in about the wind direction and the velocity being at about the wind velocity. The functions also include, in response to the substantial zero-wind condition, causing the shell structure to open such that the balloon is exposed to the external environment, and launching the balloon.

In a fourth aspect, another system is provided that includes a means for providing a balloon positioned substantially within a shell structure. The system also includes a means for determining, based on wind data associated with an external environment outside the shell structure, a wind direction and a wind velocity of wind in the external environment, and a means for causing the shell structure to move in a direction and at a velocity resulting in a substantial zero-wind condition. The zero-wind condition includes the direction being in about the wind direction and the velocity being at about the wind velocity. The system additionally includes in response to the substantial zero-wind condition, a means for causing the shell structure to open such that the balloon is exposed to the external environment, and launching the balloon.

These as well as other aspects, advantages, and alternatives, will become apparent to those of ordinary skill in the art by reading the following detailed description, with reference where appropriate to the accompanying drawings.

DETAILED DESCRIPTION

Figure 1:
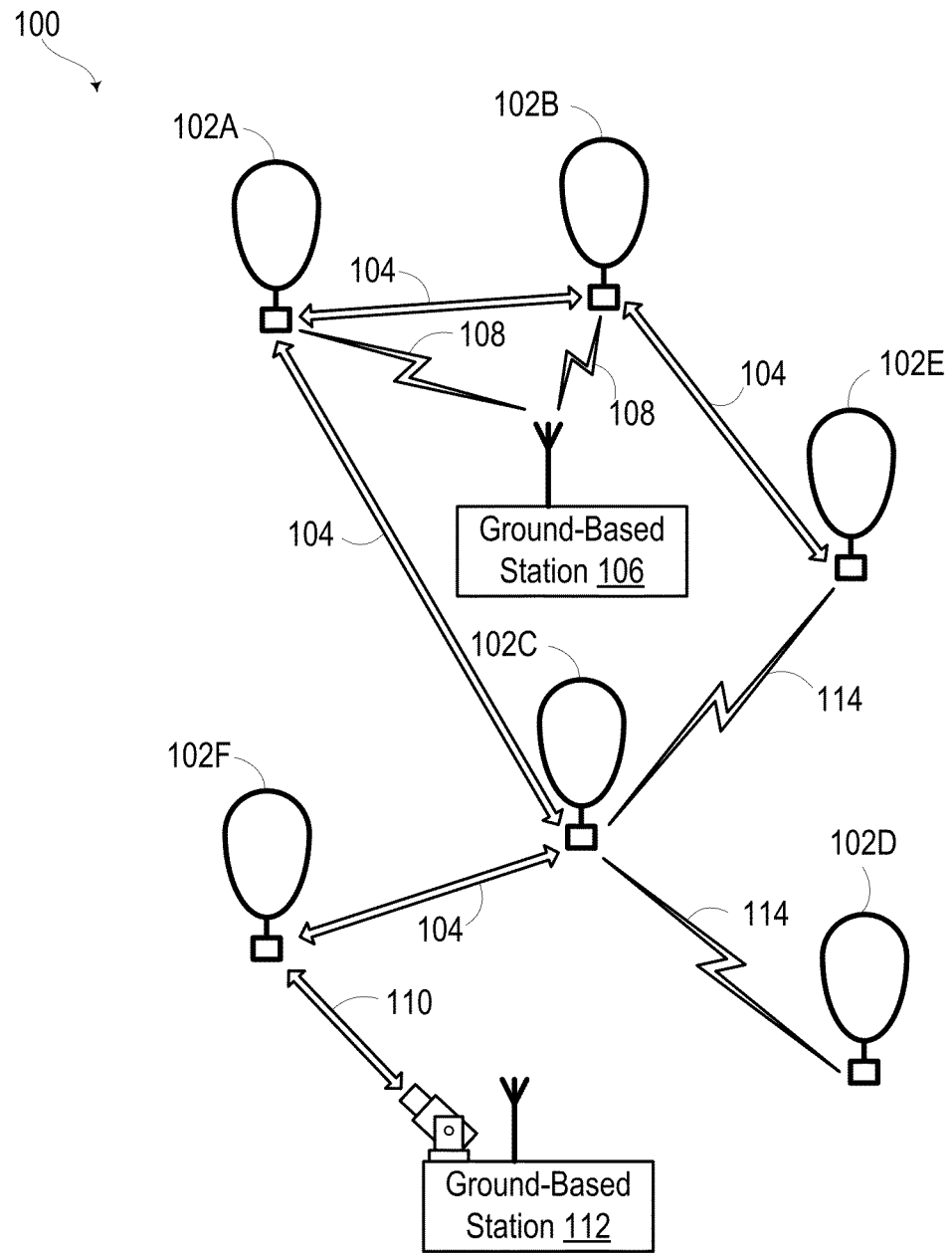
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able to find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using ultra-bright LEDs (which are also referred to as "high-power" or "high-output" LEDs). In some instances, lasers could be used instead of or in addition to LEDs, although regulations for laser communications may restrict laser usage. In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

The present disclosure describes various example embodiments of apparatuses, methods, and functions executable by a computer-readable medium that are generally operable to aid in the launching of balloons that may operate in such a high-altitude balloon network. Beneficially, the disclosed methods and mechanisms may improve the operational lifespan of balloon envelopes, which may reduce the maintenance and/or costs involved with operating the balloon network. Namely, the disclosed methods and mechanisms may provide protection from wind gusts during balloon inflation and/or launch.

In an example embodiment, a method may include providing a balloon positioned substantially within a shell structure. The balloon may include an envelope in an inflated state. Additionally, the method may include determining, based on wind data associated with an external environment outside the shell structure, a wind direction and a wind velocity of wind in the external environment.

Yet further, the method may include causing the shell structure to move in a direction and at a velocity resulting in a substantial zero-wind condition. The zero-wind condition may include the direction being in about the wind direction and the velocity being at about the wind velocity. For example, the shell structure and the balloon could be moved in an effort to match the wind direction and wind velocity. In some embodiments, a forklift or other vehicle could move the shell structure.

The method may also include, in response to the substantial zero-wind condition, causing the shell structure to open such that the balloon is exposed to the external environment, and launching the balloon. For example, upon determining that the shell structure is moving at approximately the same velocity and direction as the wind in the external environment, the shell structure may be opened and the balloon may be launched.

2. Example Balloon Networks

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
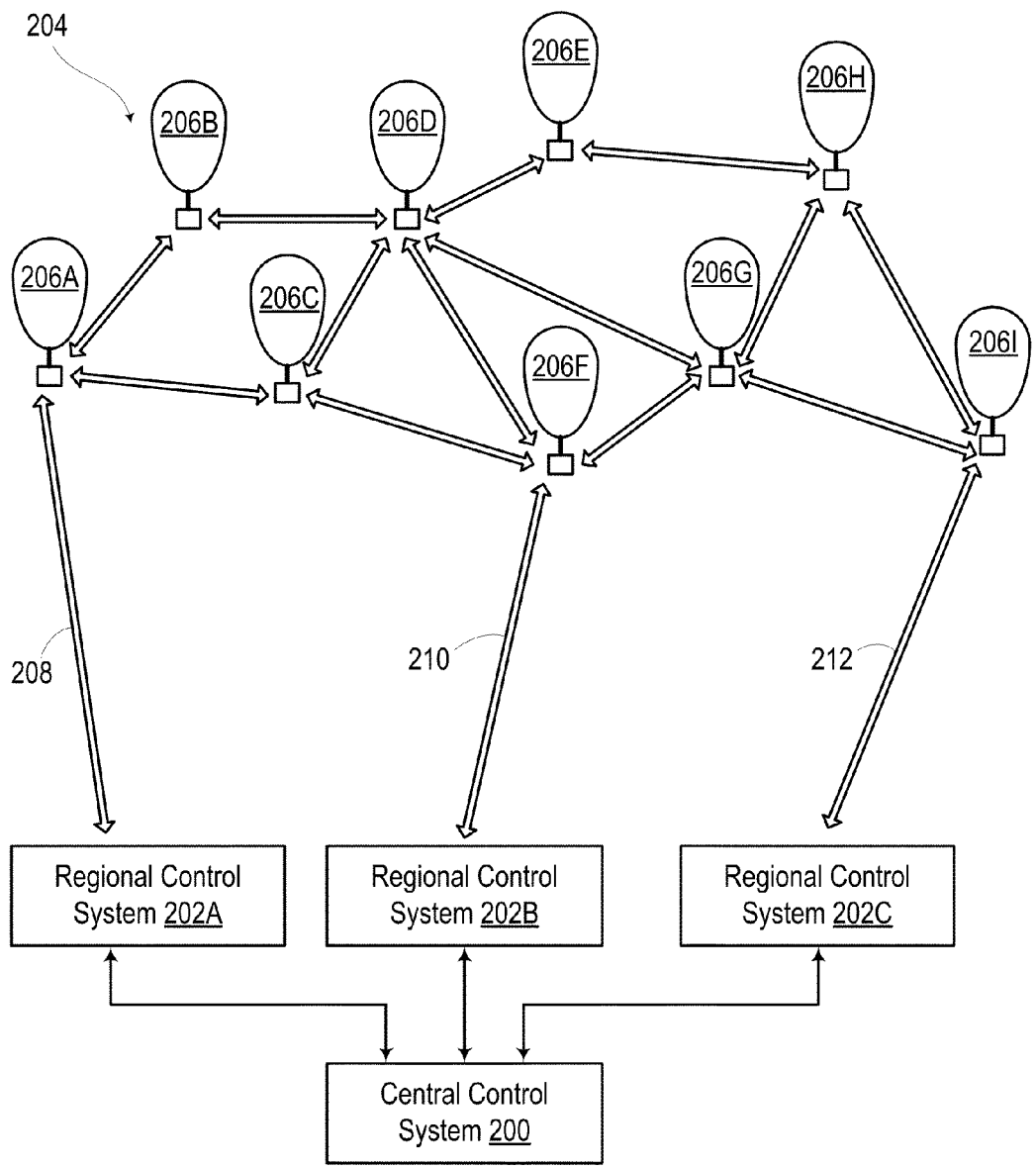
FIG. 2 is a simplified block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_j$, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
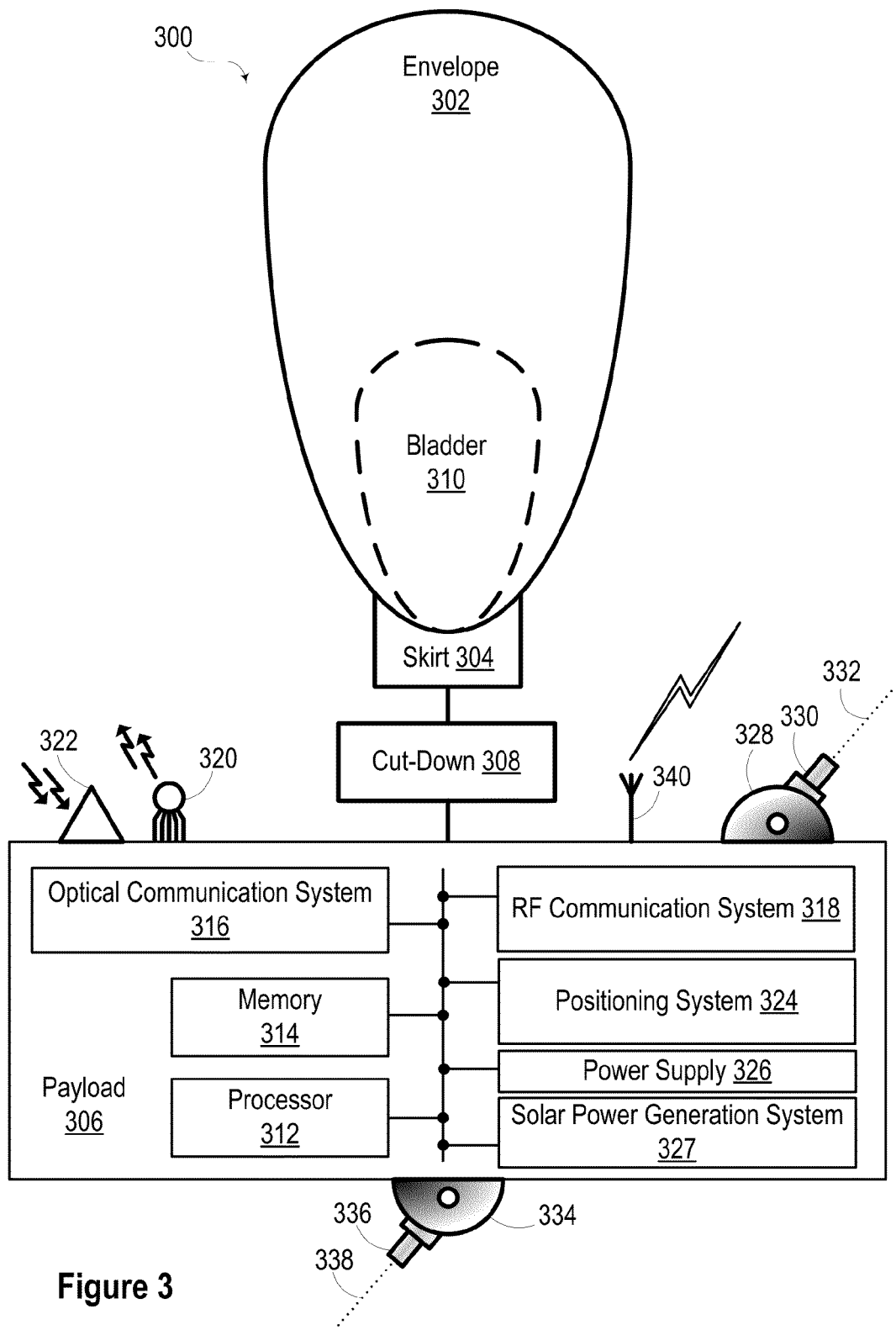
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 17 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein. Thus, processor 312, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or another lighter-than-air gas or combination of gases. When inflated, the envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

4. Illustrative Systems

Figure 4:
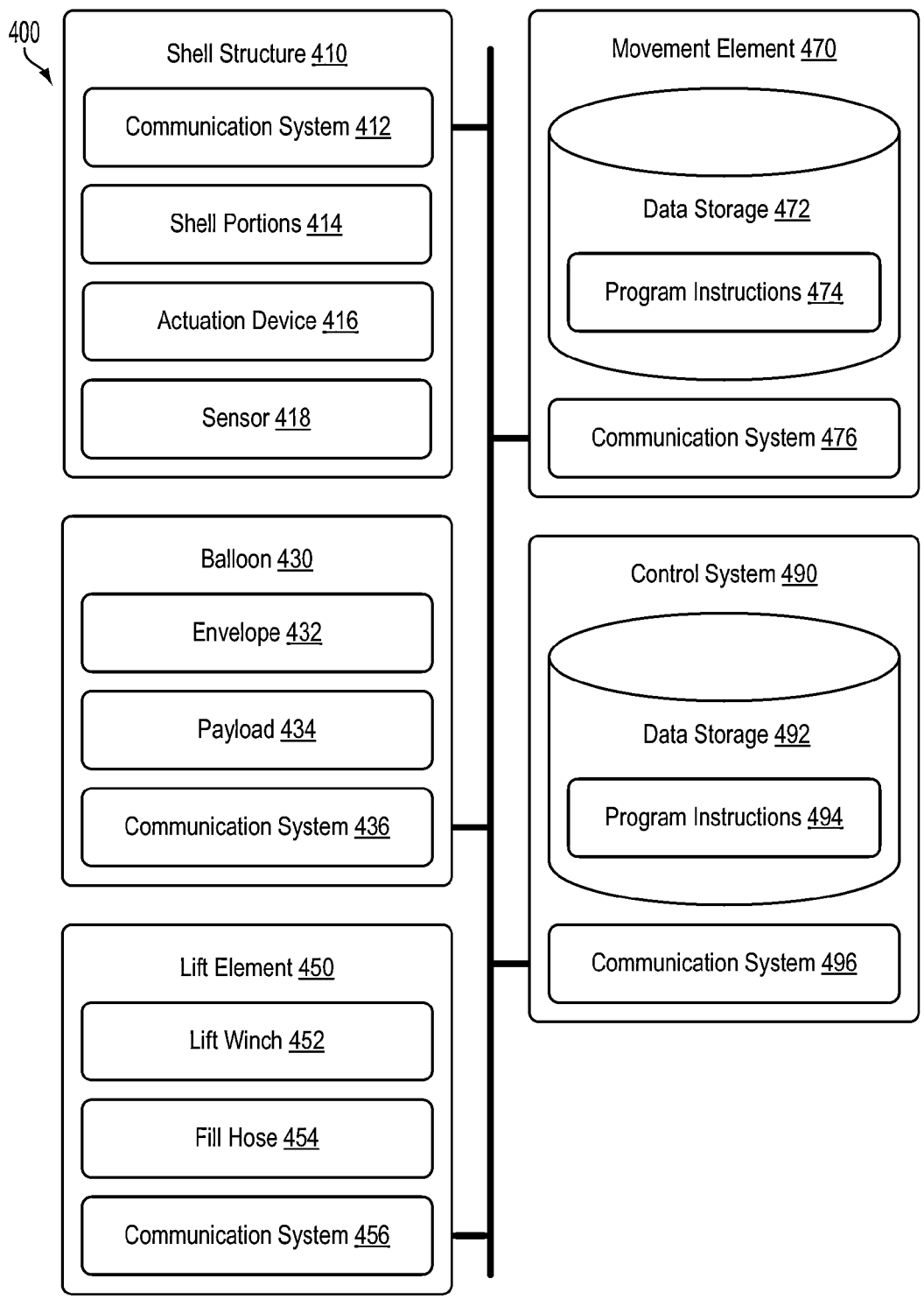
FIG. 4 is a simplified block diagram illustrating a balloon-launching system, according to an example embodiment.

A balloon-launching system may include a shell structure, a balloon, a movement element, and a control system. The system may optionally include a lift element. Accordingly, illustrative systems may be described in reference to FIGS. 4-8. FIG. 4 is a simplified block diagram illustrating a shell-structure 410, a balloon 430, a lift element 450, a movement element 470, and a control system 490, according to an example embodiment.

The shell structure 410 may include a communication system 412, at least two shell portions 414, an actuation device 416, and/or a sensor 418. The shell portions 414 could include at least two shell elements that are configured to open and close. The shell portions 414 may take various shapes. For example, the shell portions 414 may be shaped like a clam shell. Alternatively, the shell portions 414 may be shaped like several flower petals that may open and close. Other geometries for shell portions 414 will be obvious to those skilled in the art. The shell portions 414 may be operable to close around the balloon 430 so as to protect the balloon 430. Specifically, while enclosed by the shell structure 410, the balloon 430 may be substantially protected from wind gusts and other environmental elements in the external environment outside the shell structure 410. Furthermore, the shell portions 414 may be operable to open so as to allow the balloon 430 to launch.

The shell structure 410 may include at least an inner portion and an outer portion. The inner portion may include a soft material configured to reduce a friction force when in contact with the envelope 432. The outer portion may include a rigid material configured to resist a wind force in the external environment. In an illustrative embodiment, the inner portion may include a non-stick coating material such as Teflon. Other materials for the inner portion of the shell structure 410 may be utilized so as to minimize damage to the envelope 432. The outer portion may include rigid materials like engineered composites (e.g. fiberglass, carbon fiber-reinforced polymers, metal matrix composites, and/or ceramic matrix composites). In general, the shell structure 410 may include fire-retardant or fire-resistant materials.

The actuation device 416 may be coupled to the at least two shell portions 414. The actuation device 416 may be configured to open and close the at least two shell portions 414. Accordingly, the actuation device 416 may include at least one hydraulic piston. The actuation device 416 may be operable using other forms of actuation (e.g. electro-magnetic, pneumatic, etc.) The actuation device 416 may be coupled to other parts of the system 400. For example, the actuation device may be coupled to the movement element 470.

The balloon 430 may be similar or identical to balloon 300 as illustrated and described in reference to FIG. 3. Specifically, the balloon 430 may include an envelope 432, a payload 434, and a communication system 436. The balloon 430 may be operable in a balloon network as described herein. Furthermore, the balloon 430 may be configured to be positioned within the shell structure 410. When initially positioned within the shell structure 410, the envelope 432 may be uninflated and compressed. In other words, the envelope 432 may be folded or packed into a package for easier shipping and/or handling. The balloon 430 may include a tether that may be coupled to an anchor. The anchor may be a physical weight or may be an anchor point on the shell structure 410. The tether may be configured to physically tie down the balloon to the shell structure while inflated. The tether may additionally be configured to be controllably decoupled from the shell structure 410 and/or the balloon 430. For example, in response to a launch command, for instance from control system 490, the tether may be decoupled so as to allow the balloon 430 to launch.

The system may optionally include a lift element 450. The lift element 450 may include a lift winch 452, a fill hose 454, and a communication system 456. The lift element 450 may be configured to unpack the envelope 432. The lift element 450 may also be configured to fill the envelope 432 with lift gas. In an illustrative embodiment, the lift element 450 may include a gantry crane. The gantry crane may be configured to lift the envelope 432 while the balloon 430 is enclosed by the shell structure 410. For example, the lift winch 452 may be configured to pass through an opening in the shell structure 410, couple to the envelope 432, and pull the envelope 432 in a direction perpendicular to the ground. The lift winch 452 may include elements such as a winch motor, winch cable, and a hook or another device configured to couple the lift winch 452 to the envelope. In such an embodiment, forces exerted on the envelope 432 by the lift winch 452 may stretch the envelope 432 in a vertical direction so as to unpack and decompress the envelope 432. The fill hose 454 may be optionally configured to be coupled to the lift winch 452. The fill hose 454 may be configured to deliver lift gas to the envelope 432. The fill hose 454 and the lift winch 452 may be configured to couple to the envelope 432 at the same location. Alternatively, the fill hose 454 and the lift winch 452 may be configured to couple to the envelope 432 at separate locations. Furthermore, the fill hose 454 and the lift winch 452 need not be separate physical elements. For example, the fill hose 454 may be configured to stretch the envelope 432 as well as fill the envelope 432 with lift gas.

The system may also include a movement element 470. The movement element 470 may include data storage 472, program instructions 474, and a communication system 476. The movement element 470 may include a vehicle, such as a forklift, a truck, a car, a ship, or any other vehicle configured to lift and move a load. In an illustrative embodiment, the movement element 470 may include power-operated forks or prongs configured to couple to the shell structure 410. The movement element 470 may be configured to move the shell structure 410 and, optionally, the balloon 430. Specifically, the movement element 470 may be configured to move the shell structure 410 (and optionally enclosed balloon 430) in a plane substantially parallel to the ground.

The control system 490 may include data storage 492, program instructions 494, and a communication system 496. The communication system 496 may be configured to communicate with any or all of communication systems 412, 436, 456, and 476. In other words, the control system 490 could be configured to transmit and/or receive information from any of the shell structure 410, balloon 430, lift element 450, and/or the movement element 470. The control system 490 may be configured to cause the lift element 450 to unpack and fill the envelope 432 while the shell structure 410 encloses the balloon 430. Additionally, the control system 490 may be configured to determine a wind direction and a wind velocity of wind in an external environment outside the shell structure 410. In an illustrative embodiment, a wind sensor may provide wind data to the control system 490. Based on the received data, the control system 490 may be configured to calculate, predict, and/or estimate wind conditions outside the shell structure 410.

The control system 490 may be further configured to cause the movement element 470 to move along the ground at a velocity and in a direction substantially matching the determined wind velocity and the wind direction. In so doing, a zero-wind condition may result. In other words, a zero-wind condition may result from moving the movement element 470 at a velocity and in a direction matching external wind conditions. In response to the zero-wind condition, the control system 490 may be configured to cause the shell structure to open. In an illustrative embodiment, the control system 490 may optionally determine a zero-wind condition while the shell structure 410 is moving at a velocity and in a direction substantially matching the external wind conditions. Upon determining the zero-wind condition, the control system 490 may transmit a signal to cause the shell structure 410 to open. Furthermore, the control system 490 may be configured to cause the balloon 430 to launch in response to the zero-wind condition. In an illustrative embodiment, the control system 490 may transmit a signal to cause the balloon 430 to launch after opening the shell structure 410.

5. Illustrative Methods

Figure 9:
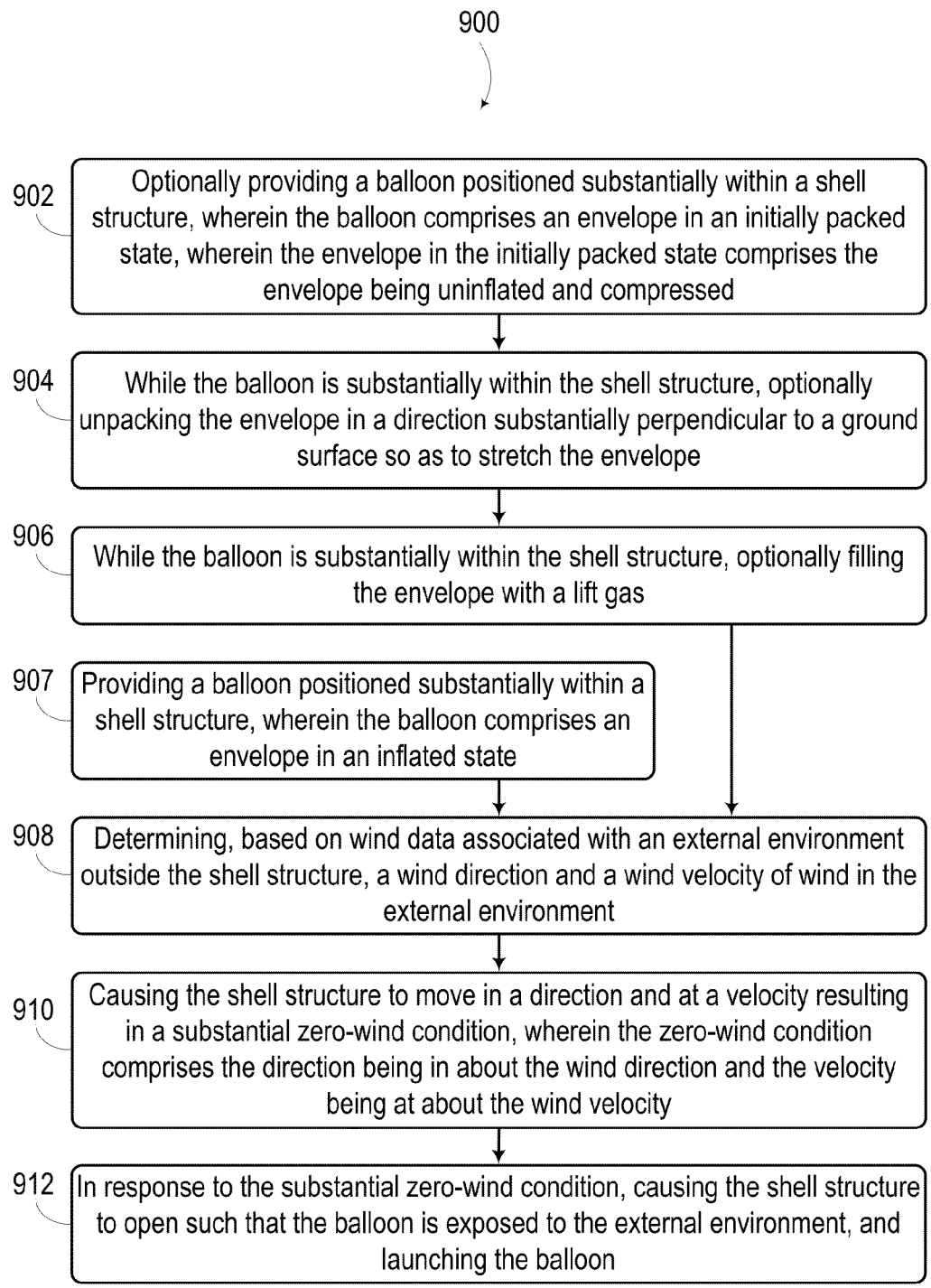
FIG. 9 is a method, according to an example embodiment.

A method 900 is provided for launching a balloon under zero-wind conditions. Method 900 may optionally provide for the unpacking and filling of the balloon prior to launch. The method may be performed using any of the apparatus shown in FIGS. 1-4 and described above. However, other configurations may be used. FIG. 9 illustrates the functions in an illustrative method 900 with reference to FIGS. 3-8. It is understood that in other embodiments, the functions may appear in different order and functions could be added or subtracted.

Figure 5:
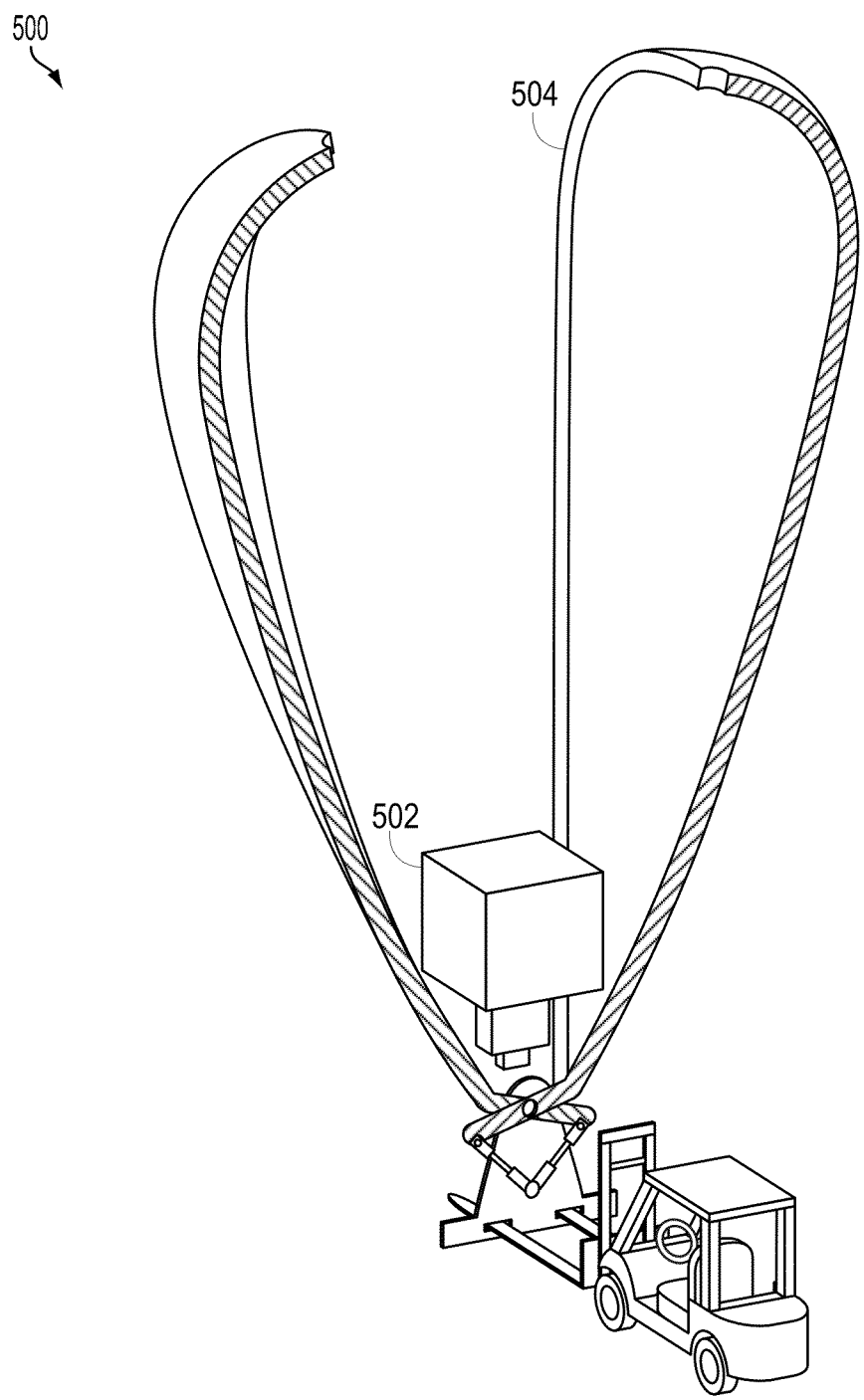
FIG. 5 depicts an optional balloon-loading scenario, according to an example embodiment.

Function 902 includes optionally providing a balloon positioned substantially within a shell structure. The balloon includes an envelope in an initially packed state. The balloon may be similar or identical to balloon 300 in FIG. 3 or a prepackaged balloon 502 as shown in FIG. 5. The shell structure may similar or identical to shell structure 410 in FIG. 4 or a shell structure 504 as shown in FIG. 5. In an illustrative embodiment, providing the balloon substantially within the shell structure may include loading a prepackaged balloon 502 into the shell structure 504 as illustrated in FIG. 5. For example, as shown in FIG. 3, the uninflated envelope 302 and other portions of the balloon 300 may be initially packed or compressed within a package. The prepackaged balloon 502 may be loaded into the shell structure 504 in preparation for launch. After loading the prepackaged balloon 502 into the shell structure 504, the shell structure 504 may be substantially close around the prepackaged balloon 502.

Figure 6:
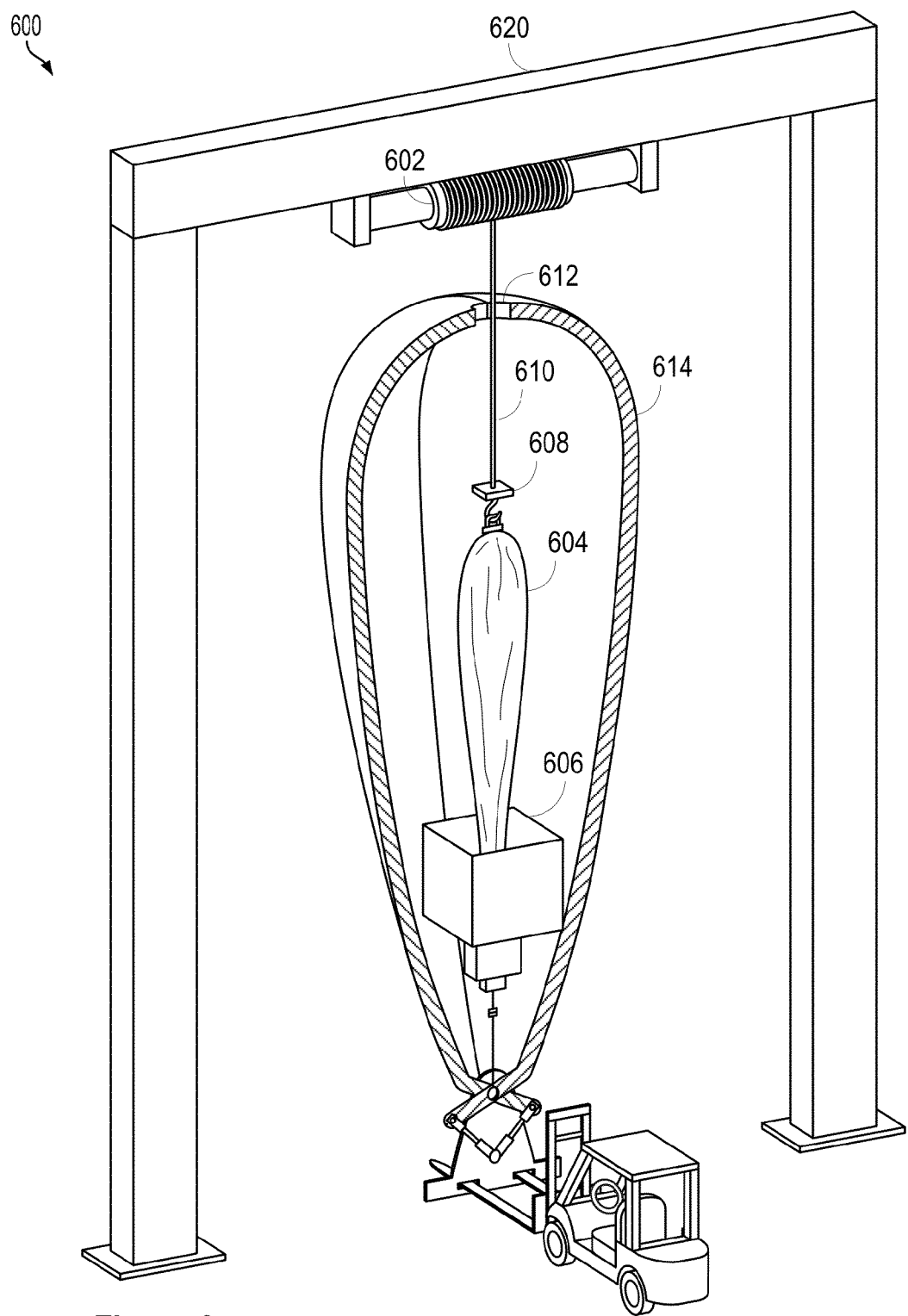
FIG. 6 depicts an optional balloon-unpacking scenario, according to an example embodiment.

Function 904 includes, while the balloon is substantially within the shell structure, optionally unpacking the envelope in a direction substantially perpendicular to a ground surface so as to stretch the envelope. In an illustrative embodiment, a lift element 602 may couple to the envelope 604 as illustrated in FIG. 6. The lift element 602 may stretch the uninflated (or partially inflated) envelope 604 in a vertical direction so as to unpack and loosen the envelope from its packaging 606. The lift element 602 may include a lift winch 608 and fill hose 610 that may pass through an opening near the top of the shell structure 612 when the shell structure 614 is closed. In some embodiments, the lift element 602 may be supported by a gantry crane 620 or another structure configured to support lifting devices.

Function 906 includes, while the balloon is substantially within the shell structure, optionally filling the envelope with a lift gas. As described above in reference to FIG. 6, the lift element may include a fill hose 610 that may couple to the envelope 604. The fill hose 610 may inflate the envelope 604 with lift gas (e.g. helium, hydrogen, hot air, etc.).

Figure 7:
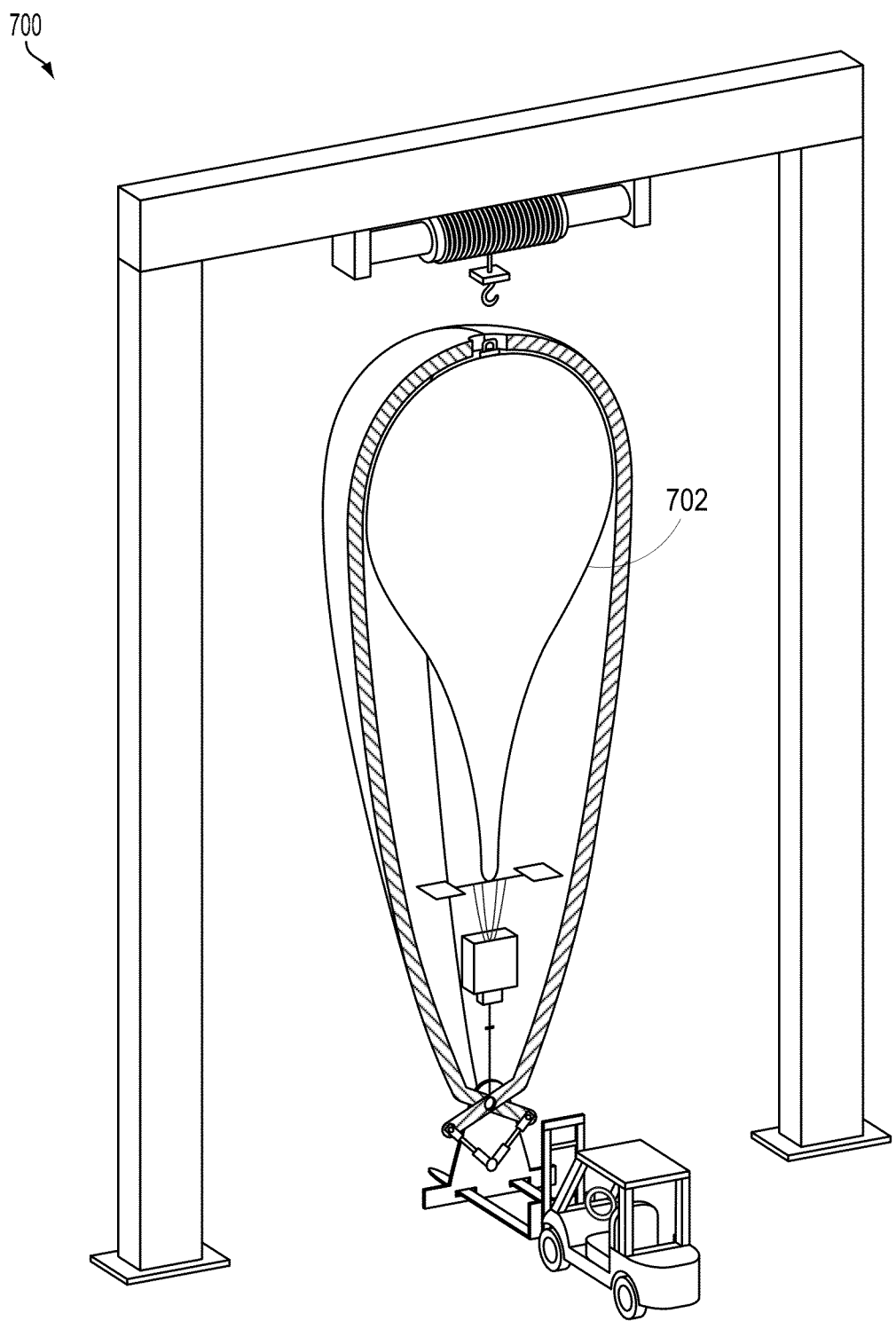
FIG. 7 depicts an optional balloon-inflation scenario, according to an example embodiment.
Figure 8:
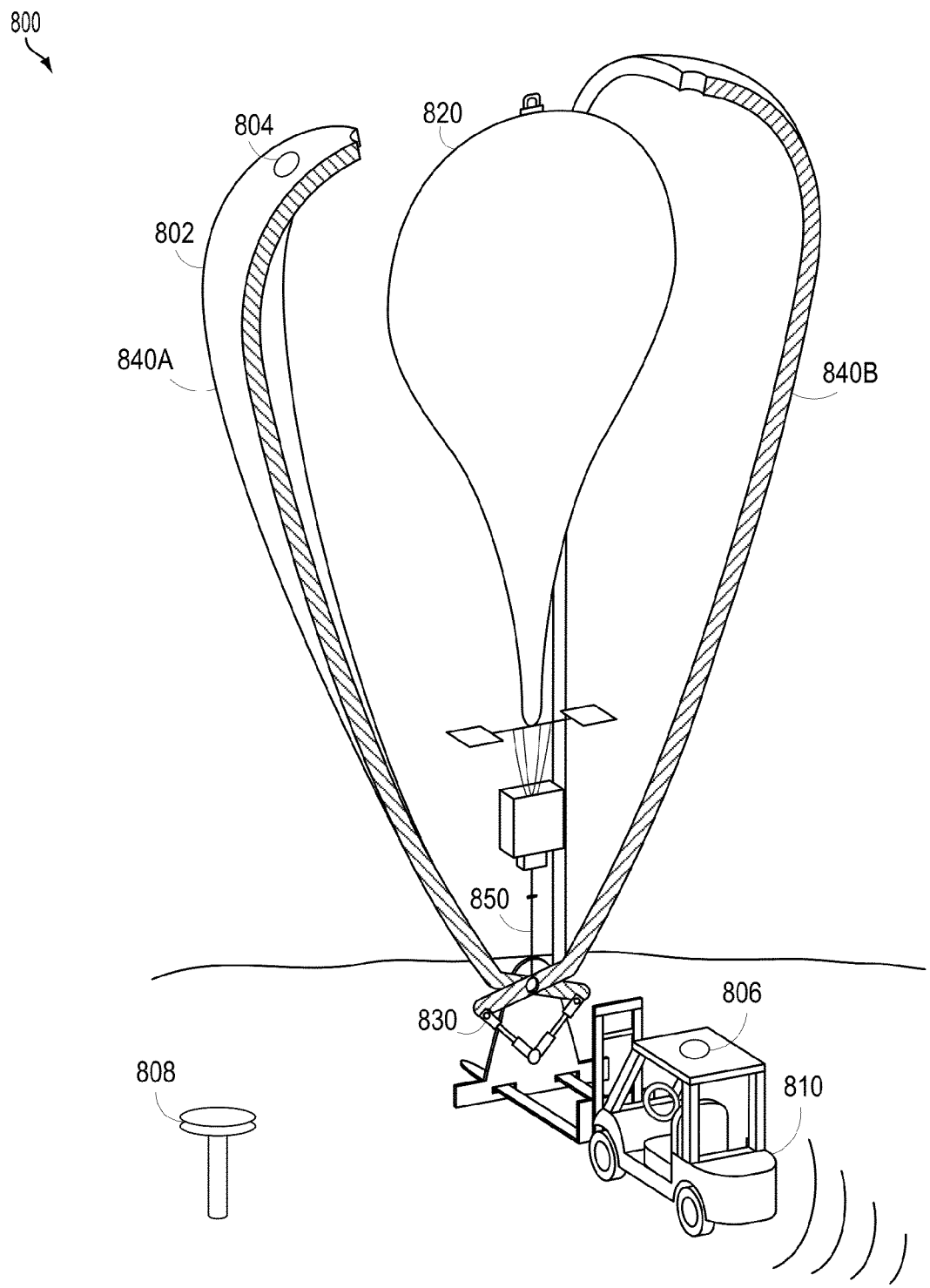
FIG. 8 depicts a balloon-launching scenario, according to an example embodiment.

Although functions 904 and 906 are described above as discrete functions, they may occur simultaneously. For example, forces applied by lift winch 608 may stretch the envelope 604 upwards out of its packaging 606 while the envelope 604 is being filled with lift gas from the fill hose 610. Additionally or alternatively, the respective steps need not be carried out to completion at any one time. For example, functions 904 and 906 could be partially performed (e.g., the envelope 604 not being fully stretched or not fully inflated) several times in an alternating fashion so as to gradually stretch and fill the envelope 604. In other words, initially the envelope 604 may be partially stretched by forces applied the lift winch 608. Then, the envelope 604 may be partially inflated by the fill hose 610, and so on until the envelope is fully inflated. FIG. 7 depicts a scenario with an inflated envelope 702 before balloon launch.

In some embodiments, Function 907 provides the balloon positioned substantially within the shell structure and the envelope of the balloon being in an inflated state. That is, in some embodiments, functions 902, 904, and 906 need not be performed within the scope of the method.

Function 908 includes determining, based on wind data associated with an external environment outside the shell structure, a wind direction and a wind velocity of wind in the external environment. The determination of the wind direction and the wind velocity may be carried out by the control system 490 as described in reference to FIG. 4. Alternatively or additionally, a different computing system may determine the wind direction and the wind velocity. The wind data may be obtained by one or more wind sensors. In an illustrative embodiment depicted in FIG. 8, a wind sensor 804 may be located on the shell structure 802. However, the wind sensor may be located elsewhere. For instance, a wind sensor 806 may be positioned on a movement element 810 or a wind sensor 808 may be fixed to the ground. Furthermore, wind sensors may be positioned in several different locations.

The determination of the wind direction and the wind velocity may include a direct measurement of the wind in the external environment. For example, if the wind sensor 808 is fixed to the ground, the determination of the wind direction and the wind velocity may be similar to conventional weather instrumentation. Alternatively or additionally, the determination of the wind direction and the wind velocity may incorporate movement of the shell structure 802 and/or the movement element 810. For example, if the wind sensor 806 is coupled to the movement element 810, and the movement element 810 is moving, the determination of the wind direction and wind velocity in the external environment may be affected by the relative movement of the wind sensor 806. Thus, in an illustrative embodiment, the determination of the wind direction and wind velocity may include adding or subtracting a movement vector (direction and velocity) to the measured wind direction and wind velocity.

Function 910 includes causing the shell structure to move in a direction and at a velocity resulting in a substantial zero-wind condition. For example, the zero-wind condition may include a condition in which the shell structure 802 is moving in a direction about the wind direction and the shell structure 802 is moving at a velocity about the wind velocity. In an illustrative embodiment, the control system 490 may cause the movement element 810 to move the shell structure 802 in a direction and at a velocity in about the wind direction and at about the wind velocity. It is understood that function 910 may be carried out simultaneously with other steps in the disclosed method. For example, the shell structure 802 may be moving while carrying out function 908 (determining the wind direction and wind velocity). Additionally, the shell structure 802 may be moving along the ground while the shell structure 802 is caused to open, as described below.

Function 912 includes, in response to the substantial zero-wind condition, causing the shell structure 802 to open such that the balloon 820 is exposed to the external environment, and launching the balloon 820. In an illustrative embodiment, depicted in FIG. 8, the shell structure 802 (and thus the balloon 820) may be traveling at approximately the same velocity and direction as the wind in the external environment, which may result in a zero-wind condition. In such a case, the control system 490 may cause the shell structure 802 to open and expose the balloon 820 to the external environment. Causing the shell structure 802 to open may include the shell structure 802 opening like two halves of a clamshell. Alternatively, the shell structure 802 may open like a flower. Causing the shell structure 802 to open may include causing an actuation device 830 to actuate the shell structure portions 840A and 840B to open. For example, the actuation device 830 may include a hydraulic piston and the control system 490 may cause the movement element 810 to charge an auxiliary hydraulic line connected to the hydraulic piston, causing the shell structure portions 840A and 840B to open.

Subsequent to causing the shell structure 802 to open, the control system 490 may cause the balloon 820 to launch. In an illustrative embodiment, the control system 490 may send a launch signal to the shell structure 802 and/or the balloon 820 so as to cause the tether 850 to uncouple the balloon 820 from the shell structure 802 or anchor. As an example, a current may be passed through a nichrome wire (not shown) wrapped around the tether 850 so as to sever the tether 850 and launch the balloon 820.

6. Illustrative Non-Transitory Computer Readable Media

Some or all of the functions described above and illustrated in FIGS. 5-9 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. In an illustrative embodiment, the non-transitory computer readable medium may include program instructions 474 and/or program instructions 494 as illustrated and described in reference to FIG. 4. The computing device that executes the stored instructions could be a computing device, such as the processor 312 as described and illustrated in reference to FIG. 3. Alternatively, the processor could be an element of the shell structure 410, the balloon 430, the movement element 470, the control system 490, and/or the lift element 450 as illustrated and described in reference to FIG. 4. Optionally, the computing device that executes the stored instructions could be another computing device, such as a server in a server network, or a ground-based station.

The non-transitory computer readable medium may store instructions executable by the any of the aforementioned processors to perform various functions. The functions include determining, based on wind data associated with an external environment outside a shell structure enclosing a balloon, a wind direction and a wind velocity of wind in the external environment. The functions further include causing the shell structure to move in a direction and at a velocity resulting in a substantial zero-wind condition. The zero-wind condition includes the direction being in about the wind direction and the velocity being at about the wind velocity. The functions also include, in response to the substantial zero-wind condition, causing the shell structure to open such that the balloon is exposed to the external environment, and launching the balloon.

The non-transitory computer readable medium may optionally include further functions such as causing the envelope to be unpacked in a direction substantially perpendicular to a ground surface so as to stretch the envelope. Further, the non-transitory computer readable medium may include additional functions such as causing a vehicle to move the shell structure. Additionally, the non-transitory computer readable medium may include functions that carry out some or all of method 900 as illustrated and described in reference to FIG. 9.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
providing a balloon positioned substantially within a shell structure, wherein the balloon comprises an envelope in an inflated state;
determining, based on wind data associated with an external environment outside the shell structure, a wind direction and a wind velocity of wind in the external environment;
causing the shell structure to move in a direction and at a velocity resulting in a substantial zero-wind condition, wherein the zero-wind condition comprises the direction being approximately in the wind direction and the velocity being approximately at the wind velocity; and
in response to the substantial zero-wind condition, causing the shell structure to open such that the balloon is exposed to the external environment, and launching the balloon.

2. The method of claim 1, wherein the envelope in the inflated state comprises the envelope having been substantially filled with a lighter-than-air gas.

3. The method of claim 1, further comprising receiving wind data associated with the external environment outside the shell structure.

4. The method of claim 1, wherein causing the shell structure to move comprises causing a vehicle to move the shell structure.

5. The method of claim 4, wherein the vehicle comprises a fork lift.

6. The method of claim 1 wherein the shell structure comprises an anchor configured to couple the balloon to the shell structure via a tether, and wherein launching the balloon comprises disconnecting the tether.

7. A system comprising:
a shell structure configured to substantially enclose a balloon and to open such that the balloon is exposed to an external environment, wherein the balloon comprises an envelope in an inflated state, wherein the external environment comprises environmental conditions outside the shell structure;
a movement element configured to move the shell structure in a plane substantially parallel to a ground surface; and
a control system configured to:
determine, based on wind data from at least one wind sensor, a wind direction and a wind velocity of wind in the external environment;
cause the movement element to move in a direction and at a velocity resulting in a substantial zero-wind condition, wherein the zero-wind condition comprises the direction being approximately in the wind direction and the velocity being approximately at the wind velocity; and
in response to the substantial zero-wind condition, cause the shell structure to open and the balloon to launch.

8. The system of claim 7, wherein the shell structure comprises an inner portion and an outer portion, wherein the inner portion comprises a soft material configured to reduce a friction force when in contact with the envelope and wherein the outer portion comprises a rigid material configured to resist a wind force in the external environment.

9. The system of claim 7, wherein the shell structure comprises a fire-retardant material.

10. The system of claim 7, wherein the envelope in the inflated state comprises the envelope having been filled with a lighter-than-air gas.

11. The system of claim 7, wherein the shell structure comprises at least two shell portions, wherein the at least two shell portions are configured to substantially close around the balloon and to substantially open so the balloon may launch.

12. The system of claim 11, wherein the shell structure comprises an actuation device coupled to the at least two shell portions and wherein the actuation device is configured to open and close the at least two shell portions.

13. The system of claim 12, wherein the actuation device comprises at least one hydraulic piston.

14. The system of claim 7, wherein the movement element comprises a forklift.

15. The system of claim 7, wherein the shell structure further comprises an anchor and wherein the shell structure is further configured to be coupled to the balloon via the anchor and a tether.

16. The system of claim 7, wherein the balloon further comprises a payload.

17. A non-transitory computer-readable medium having stored therein instructions that, when executed by a computing device, cause the computing device to perform functions comprising:
determining, based on wind data associated with an external environment outside a shell structure enclosing a balloon, a wind direction and a wind velocity of wind in the external environment;
causing the shell structure to move in a direction and at a velocity resulting in a substantial zero-wind condition, wherein the zero-wind condition comprises the direction being approximately in the wind direction and the velocity being approximately at the wind velocity; and
in response to the substantial zero-wind condition, causing the shell structure to open such that the balloon is exposed to the external environment, and launching the balloon.

18. The non-transitory computer readable medium of claim 17, further comprising receiving wind data associated with the external environment outside the shell structure.

19. The non-transitory computer readable medium of claim 17, wherein causing the shell structure to move comprises causing a vehicle to move the shell structure.

20. The non-transitory computer readable medium of claim 17, wherein the shell structure comprises an anchor configured to couple the balloon to the shell structure via a tether, and wherein launching the balloon comprises causing the tether to disconnect from the balloon.

* * * * *